(12) United States Patent
Lecointe

(10) Patent No.: US 10,287,500 B2
(45) Date of Patent: May 14, 2019

(54) LOCALIZED IRRIGATION METHOD

(71) Applicant: S.P.C.M. SA, Andrezieux Boutheon (FR)

(72) Inventor: Charles Lecointe, Vernaison (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 15/547,714

(22) PCT Filed: Feb. 23, 2016

(86) PCT No.: PCT/FR2016/050412
§ 371 (c)(1),
(2) Date: Jul. 31, 2017

(87) PCT Pub. No.: WO2016/135410
PCT Pub. Date: Sep. 1, 2016

(65) Prior Publication Data
US 2018/0022995 A1    Jan. 25, 2018

(30) Foreign Application Priority Data
Feb. 24, 2015 (FR) ..................... 15 51580

(51) Int. Cl.
| | |
|---|---|
| *C02F 1/56* | (2006.01) |
| *A01G 22/00* | (2018.01) |
| *A01G 25/00* | (2006.01) |
| *A01G 25/02* | (2006.01) |
| *A01G 25/06* | (2006.01) |
| *A01G 25/09* | (2006.01) |
| *C09K 17/20* | (2006.01) |

(52) U.S. Cl.
CPC .............. *C09K 17/20* (2013.01); *A01G 22/00* (2018.02); *A01G 25/00* (2013.01); *A01G 25/02* (2013.01); *A01G 25/06* (2013.01); *A01G 25/09* (2013.01); *A01G 25/092* (2013.01); *C02F 1/56* (2013.01)

(58) Field of Classification Search
CPC ........ A01G 22/00; A01G 25/00; C09K 17/20; C02F 1/56
See application file for complete search history.

(56) References Cited

U.S. PATENT DOCUMENTS 3,633,310 A * 1/1972 Sandiford .............. C09K 17/22
                                                         405/264
5,120,344 A    6/1992 Libor et al.
(Continued)

FOREIGN PATENT DOCUMENTS

| EP | 1105443 A1 | 6/2001 |
|---|---|---|
| WO | 9857531 A1 | 12/1998 |
| WO | WO-2015015087 A1 * | 2/2015 ........... A01C 17/001 |

OTHER PUBLICATIONS

Irrigation Handbook, Cemagref Edition.
(Continued)

*Primary Examiner* — James C Goloboy
(74) *Attorney, Agent, or Firm* — Dilworth IP, LLC

(57) ABSTRACT

The invention relates to a method for the localized irrigation of crops or planted areas whereby at least one water-soluble polymer having a molecular weight between 10,000 and 500,000 Da and containing at least one acrylamide or methacrylamide monomer is injected into the irrigation water intended for supplying a stationary localized irrigation device.

13 Claims, 1 Drawing Sheet

(56) References Cited

U.S. PATENT DOCUMENTS

| | | | |
|---|---|---|---|
| 5,749,672 A * | 5/1998 | Chamberlain | A01G 25/00 405/263 |
| 6,013,708 A * | 1/2000 | Mallon | C02F 1/5245 524/156 |
| 6,343,749 B1 | 2/2002 | Thom | |
| 2002/0095965 A1 * | 7/2002 | Arnold | B02C 13/18 71/27 |
| 2009/0239973 A1 * | 9/2009 | Roos | A01G 25/092 523/132 |
| 2016/0177179 A1 * | 6/2016 | Lecointe | A01C 17/001 71/27 |

OTHER PUBLICATIONS

Phillips, S., Master's Thesis, 2007, Effect of Polyacrylamides on the Physical Properties of Some Light-textured Soils, University of Adelaide.
Mortimer, David A., Polymer international 25 (1991) 29-41.
Bucks et al., Agricultural Water Management, 2, 1979, p. 149-162.
Irrigazette, No. 146, 2015, pp. 10-15.
PCT International Search Report dated May 17, 2016 from corresponding Application No. PCT/FR2016/050412.

\* cited by examiner

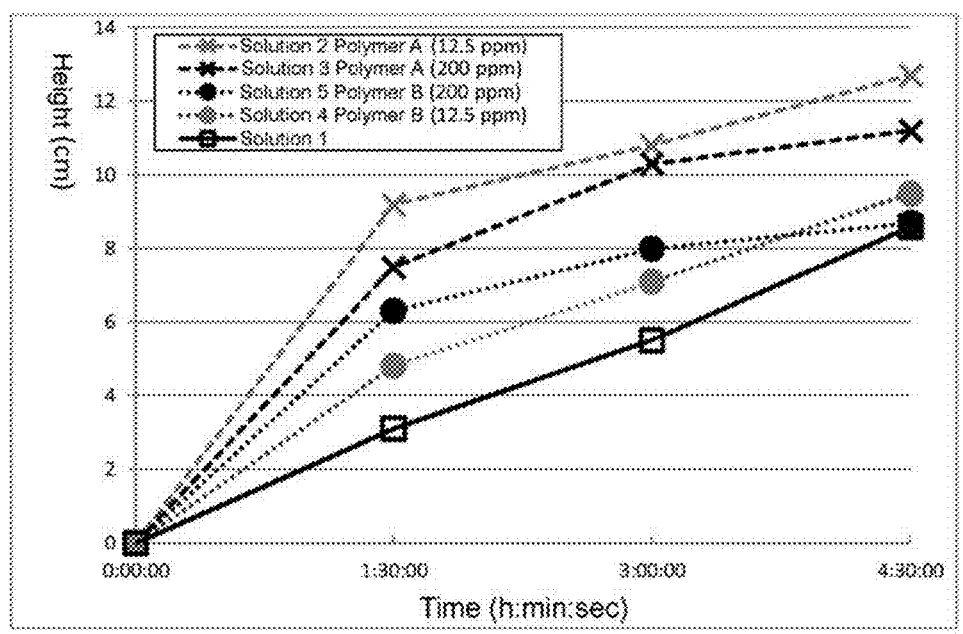

LOCALIZED IRRIGATION METHOD

The invention relates to a localized irrigation method, and more particularly a method wherein polymers are added to the irrigation water.

BACKGROUND OF THE INVENTION

The irrigation technique is well known by those skilled in the art. It consists in artificially bringing water to crop soil. It is used inter alia for crops with high water consumption (e.g., corn, cotton, etc.) or in zones with little rainfall, in order to meet the needs of the plant.

Irrigation methods for example include gravity-fed irrigation (by flooding or using lines), spray irrigation (with rollers, moving bars or pivots) and localized irrigation, but are not limited to these examples alone.

Localized irrigation encompasses a set of irrigation methods making it possible to supply water precisely, generally at lower water flow rates and from stationary equipment. Drip irrigation, porous hose irrigation and irrigation using stationary micro-sprayers are examples of localized irrigation.

Drip irrigation is an irrigation method that implements drip pipes making it possible to supply water at a very low flow rate. The name "drip" does not, however, limit this method to supplying water only in the form of drops of water. It is in fact possible to consider a very low water stream (running water).

Drip pipes are devices provided with emission orifices. They may be thin simple pipes, also called capillaries, wherein the diameter and length thereof are chosen such as to generate a sufficient pressure loss in light of the pressure of the water in the supply grid to obtain a lower water flow rate, generally below 10 liters per hour. Drip pipes may also assume the form of more sophisticated flow rate regulating devices, generally provided with narrow baffles, sometimes making it possible to obtain a fixed flow rate within a given pressure range.

Under agricultural production conditions, drip irrigation systems generally assume the form of pipes provided with orifices having equipment making a possible to control the flow rate of the water through this orifice for given pressures (example: UNIRAM® or DRIPCORN® equipment provided by the company NETAFIM).

Typically, the localized irrigation methods lead to an irrigation bulb positioned near each water emission point. This bulb appears within the first moments following the startup of the irrigation (the irrigation bulb corresponds to the moistened zone, p. 46 in the Irrigation Handbook, Cemagref Edition).

The aim of these irrigation methods is to ensure that the moistening bulbs result in being joined together, making it possible, from one to the next, to achieve homogeneous moistening of the arable layer. Indeed, a deep infiltration of the water is not beneficial to the crops. It follows that the zones not receiving irrigation water between the emission points would represent a proportional amount of less productive surface area. Increasing the diameter of the irrigation bulb also makes it possible to separate the water emission points. This results in a lower cost per surface unit of a localized irrigation installation.

To allow for better distribution of the water, document U.S. Pat. No. 6,343,749 proposes moving irrigation systems in the form of drip lines moving over the surface of a parcel, for example using a pivot. However, this method requires heavy equipment demanding considerable investments and energy. Furthermore, the emitting members travel paths parallel to one another. The absence of overlap of the traveled zones causes non-homogeneous moistening of the arable layer.

Drip irrigation systems can also be buried. In the case of a corn crop, for example, the drip pipes are generally buried between 20 and 60 cm deep. This type of installation makes it possible to leave the installation in place, without having to move or remove the pipes on the surface when working the field. In the case of a buried drip irrigation system, the rising of the water to the surface is an important point, making it possible to do without a surface irrigation system.

Acrylamide-based polymers can be added to the irrigation water for various benefits, such as decreasing water and wind erosion, controlling rain damage or controlling water infiltration in the soil. The Natural Resources Conservation Service at the USDA concisely describes this use of acrylamide-based polymers added to the irrigation water within the Conservation Practice Standard Code 450.

The polymers used to stabilize the soil are polymers with a high molecular weight (greater than 1 million Daltons). As an example, the document EP 1,105,443 describes soil treatment compositions that may in particular be beneficial in the stabilization of soils and that may be used in drip irrigation methods. The compositions are aqueous solutions comprising, inter alia, a water-soluble anionic polymer having an intrinsic viscosity of 9 to 12 dL/g (at 20° C., in a solution of NaCl 1 M at pH 7.0). It is mentioned that the polymer has a high enough molecular weight to provide a soil stabilization effect. It is also specified that it does not have a low molecular weight, which would otherwise cause it to act as a dispersant.

Such polymers can be used in localized irrigation systems. For example, Shane Phillips (Master's Thesis, 2007, *Effect of Polyacrylamides on the Physical Properties of Some Light-textured Soils*, University of Adelaide) describes drip irrigation systems.

The addition of these polymers to the irrigation water is performed using emulsions, dispersions or a powdered product previously dissolved in a parent solution.

The aqueous dispersion polymers (dispersion in saline solution) have a high salt content and therefore have a risk of clogging the outlet orifices for the irrigation water (drip pipes, pores, micro-sprayers).

The emulsions can be used to prepare a parent solution or be injected directly in the water grid that supplies the drip pipes. Document WO1998/057531 thus describes the injection of the polymer in emulsion form in a pressurized irrigation system.

The polymers can be added to the irrigation water in powder form, for example in the case of a gravity-fed irrigation system. However, the powder form is impractical to handle, since it causes dust formation, which is dangerous for the user. Furthermore, this form requires a mixing apparatus and a substantial dissolution time. When the dissolution is not done correctly, it generates lumps that then plug the drip pipes of a drip system. Lastly, the maximum soluble polymer concentration within the water is limited for polymers with a high molecular weight.

Using an inverse emulsion of acrylamide-based polymers with a high molecular weight requires being able to reverse this emulsion correctly and to dilute it in water quickly. In the case, for example, of a large spray irrigation system such as a pivot, the water volumes and flow rate used facilitate the reversal of these emulsions. In the case of localized irrigation systems such as drip irrigation systems, the water pressure and flow rate are low, making the reversal of the emulsion injected into the water supply grid random. If the reversal is performed incorrectly, a lump of polymer forms and can plug the pipes, the micro-sprayers or the drip pipes, for example. Furthermore, the reverse emulsions of acrylamide-based polymers generally contain solvents, such as mineral oils, that are incompatible with certain materials used in localized irrigation systems: PVC, low-density polyethylene, elastomers, etc.

Another solution may be to use polymers in solution. However, polyacrylamides with a high molecular weight in solution are then at low concentrations (with a maximum polymer concentration of 5 to 10% by weight). This would therefore create logistical problems due to the very large quantities of solution to be transported and handled.

By nature, polyacrylamides with a high molecular weight are flocculant. This is also why they are used in agriculture. Their flocculant power stabilizes soil and limits the particles in suspension, thus decreasing erosion. In a localized irrigation system like a drip irrigation system, the flow rates are low and the water emission orifices are narrow. The presence of particles in suspension in the water, even in a low concentration, causes, in contact with the polyacrylamide, the formation of flocks that clog the irrigation water outlet orifices (drip pipes, micro-sprayers, pores), or even the water supply grid itself.

To resolve this problem, an attempt could be made to add the polymers based upon acrylamides with a high molecular weight upstream from a filtration system, for example a sand filter. This would result in removing a non-negligible part of the previously added polymers from the irrigation water, by retaining the flocks or adsorbing polymers, rendering the entire method pointless.

Document U.S. Pat. No. 3,633,310 describes a method making it possible to improve the irrigation of highly permeable soil. This method consists in adding irrigation water, a small quantity of polyacrylamide with a molecular weight between 300,000 and 15 M, advantageously between 500,000 and 5 M. The polyacrylamide makes it possible to make any portion of the irrigated soil less permeable for subsequent irrigations (without adding polyacrylamide). No irrigation method is mentioned.

Document U.S. Pat. No. 5,120,344 describes a method consisting of applying a layer of gel at a small depth on the surface of the soil to be irrigated to improve the retention of water and nutrients. This layer of gel is obtained from a clay and a polymer having a molecular weight between 50,000 and 20 M Da, preferably between 500,000 and 10 M Da. The gel is formed before being introduced into the soil or "in situ" in the soil. In all cases, the layer of gel is applied before any irrigation.

Document US 2009/0239973 A1 describes an irrigation system implementing polyacrylamide with a molecular weight between 10,000 and 100,000 Da. Several embodiments are proposed. The first method consists in spraying irrigation water on a polyacrylamide block. The second method consists in positioning the polyacrylamide block within channels wherein the irrigation water circulates. This is not a localized irrigation method.

SUMMARY OF THE INVENTION

The problem that the invention therefore proposes to resolve is that of increasing the diameter of the irrigation bulb while avoiding flocculation phenomena within a localized irrigation method.

The Applicant has observed that surprisingly, the implementation of a polymer based upon acrylamide with a low molecular weight within the irrigation water made it possible to resolve this problem.

DETAILED DESCRIPTION OF THE INVENTION

More specifically, the present invention relates to a method for the localized irrigation of crops or planted areas whereby at least one water-soluble polymer having a molecular weight between 10,000 and 500,000 Da and containing at least one acrylamide or methacrylamide monomer is injected into the irrigation water intended for supplying a stationary localized irrigation device.

Advantageously, the water-soluble polymer has a molecular weight between 25,000 and 300,000 Da, and still more advantageously between 50,000 and 250,000 Da.

"Water-soluble polymer" refers to a polymer that, in solution, by virtue of agitation in water at a temperature of 25° C. at a concentration of 50 g/L, yields a solution that is free of insoluble particles.

Preferably, the localized irrigation system is a drip irrigation system.

Preferably, the polymer is added to the irrigation water under conditions such that the weight concentration of polymer in the irrigation water is between 0.1 ppm and 500 ppm, and more preferably between 1 and 200 ppm (1 ppm=0.0001% by weight).

In one preferred embodiment, in order to avoid all of the problems previously explained in relation to the physical form of the polymer, the water-soluble polymer(s) are injected into the irrigation water in the form of an aqueous solution wherein the weight concentration of water-soluble polymer is between 10 and 60%, more preferably between 30 and 50%.

The water-soluble polymer(s) are preferably made up of at least 50 mol %, and more preferably at least 70 mol %, of the acrylamide or methacrylamide monomer.

In one preferred embodiment, they further contain at least one anionic monomer.

In practice, the water-soluble polymer(s) contain, under these conditions, from 1 to 50 mol %, and more preferably from 1 to 30 mol %, of anionic monomers.

The anionic monomers are advantageously chosen from the group comprising acrylic acid, methacrylic acid, itaconic acid, crotonic acid, maleic acid, fumaric acid and monomers of the strong acid type for example having a function of the sulfonic acid or phosphonic acid type, such as 2-acrylamido-2-methylpropane sulfonic acid, vinylsulfonic acid, vinylphosphonic acid, allylsulfonic acid, allylphosphonic acid, styrenesulfonic acid and salts thereof soluble in water of an alkaline metal, and alkaline-earth metal or ammonium.

The water-soluble polymer(s) may contain cationic monomers. Examples of cationic monomers include diallyldialkyl ammonium salts such as diallyl dimethyl ammonium chloride (DADMAC), the acidified or quaternized salts of dialkylaminoalkyl acrylates or methacrylates, in particular dialkylaminoethyl acrylate (ADAME) and dialkylaminoethyl methacrylate (MADAME), the acidified or quaternized salts of dialkyl-aminoalkylacrylamides or methacrylamides, for example methacrylamido-propyl trimethyl ammonium chloride (MAPTAC), acrylamido-propyl trimethyl ammonium chloride (APTAC) and Mannich products, such as quaternized dialkylaminomethylacrylamides.

In another preferred embodiment, the water-soluble polymer(s) will be non-ionic.

In addition to the acrylamide or methacrylamide, the water-soluble polymer(s) may contain other nonionic monomers that may be chosen from the group comprising water-soluble vinylic monomers. One preferred monomer belonging to this class is for example N-methylolacrylamide. N-vinylformamide may also be used.

The water-soluble polymer(s) may contain a maximum of 1% by weight of one or several hydrophobic monomers of the acrylamide, acrylic, vinylic, allylic or maleic type having a side hydrophobic function in particular chosen from among acrylamide derivatives such as N-alkylacrylamides, for example acrylamide diacetone, isopropyl acrylamide, N-tert-butylacrylamide, octylacrylamide, N,N-dialkylacrylamides such as N,N-dihexylacrylamide, acrylic acid derivatives such as alkyl acrylates and methacrylates and vinylic monomers such as N-vinylformamide, N-vinyl acetamide, N-vinylpyridine and N-vinylimidazole and N-vinylpyrrolidone.

The polymers used within the context of the invention do not require particular development of the polymerization method. To obtain the water-soluble polymers used in the method, one skilled in the art will opt for polymerization in solution as described in Synthetic poly electrolytes—a review—David A Mortimer—Polymer international 25 (1991) 29-41.

Jointly with the water-soluble polymers, other ingredients in liquid form, for example phytosanitary products, herbicides, pesticides, fungicides, fertilizing elements may be added to the irrigation water according to the method.

In the method according to the invention, the polymer is preferably directly added to the irrigation water by means of the in-line injection of the concentrated polymeric solution within the irrigation water pipe.

For gravity-fed systems (example: NDJ DripKit system provided by the company NANDANJAIN irrigation), the irrigation water within the localized irrigation system is pressurized by means of elevating the water reserve (tank). In this case, the polymer(s) may be directly added to the irrigation water within the water reserve.

The addition of a polymer in the form of a concentrated solution makes it possible to avoid manipulating large quantities of polymeric solutions, but also eliminates the risk of non-solubilized polymer residues clogging the "drip pipes" for a drip irrigation system (which could be the case with a powdered polymer or a polymer in emulsion).

Alternatively, if there is a need to dilute the concentrated polymer solution, the latter may be diluted in successive ways in order to obtain the targeted concentration within the irrigation water at the outlet of the emission points. For example, a parent solution may be prepared by diluting the concentrated solution before injecting the parent solution, or the parent solution may be injected in line, in successive dilution loops. These steps may be required to make the initial concentration of the concentrated solution appropriate for the available injection equipment to obtain the targeted final concentration.

Lastly, the inventive method makes it possible to avoid clogging risks of the irrigation orifices (drip pipes, pores, micro-sprayers) by flocculation of the particles in suspension in the irrigation water, but also to obtain homogeneous irrigation around the drip pipes, in all three dimensions.

The invention and resulting benefits will become clear from the following examples supported by the attached FIGURE.

BRIEF DESCRIPTION OF THE DRAWINGS

FIG. 1 is a graph showing the moistening height (cm) of soil samples as a function of time (h) in a buildup test by capillarity.

EXAMPLES

Example 1

Buildup Test by Capillarity in Soil Columns

Soil samples defined as sandy fibrous clay according to the Aisne texture triangle are dried, ground and screened in order to remove elements therefrom with a size larger than 3 mm before being placed in 5 transparent PVC tubes (height: 24 cm, diameter 45 mm).

Each tube is provided at the bottom thereof with a large mesh filter made from stainless steel covered by a layer of 1 cm of filter gravel. The soil samples are next packaged into the tubes, then moistened maximally before being dried in an oven in order to obtain structured soil samples. Each soil column then has a height of 18 cm.

For each of the columns, the base is next partially vertically submerged within an aqueous solution (solutions 1 to 5 below) such that the first lower 2.5 cm of each soil column is submerged within the aqueous solution. As the water is sucked through the soil column, the level of the aqueous solutions is kept at a constant level.

Solution 1: Water

Solution 2: Aqueous solution containing 12.5 ppm of an acrylamide and sodium acrylate copolymer A in water. The polymer contains 8 mol % of sodium acrylate. This solution is obtained by means of the dilution of a parent solution of the polymer with a weight concentration of 40%. The molar mass of the polymer is about 200,000 Da (intrinsic viscosity: 1.18 dL/g, at 20° C., in a 1 M solution of NaCl at pH 7.0).

Solution 3: Equivalent to solution 2, with the sole difference that the aqueous solution contains 200 ppm of polymer A.

Solution 4: Aqueous solution containing 12.5 ppm of an acrylamide and sodium acrylate copolymer B in water. The polymer contains 30 mol % of sodium acrylate. This solution is obtained by means of a polymer dispersion with a weight concentration of polymer of 15%. The molar mass of the polymer B is about 12 million Da (intrinsic viscosity: 17.75 dL/g, at a 20° C., in a 1 M solution of NaCl at pH 7.0).

Solution 5: Equivalent to solution 3, with the sole difference that the aqueous solution contains 200 ppm of polymer B.

FIG. 1 shows the moistening height (cm) of the soil samples as a function of time (h). The zero point is the surface of the aqueous solution.

The buildup of the water by capillarity is essential in order to guarantee the effectiveness of a buried drip irrigation system. Yet the fastest diffusion is shown to occur for the solutions containing polymer A (polymer representative of the polymer used in the inventive method).

Example 2

Clogging Risk Test

A synthetic irrigation water is prepared by doping potable water taken from the distribution grid with 160 mg/L of kaolin and 27 mg/L of $CaCl_2$. This synthetic irrigation water would, due to the quantity of matter in suspension, be ranked 10 on a scale up to 20 as established by Bucks, Nakayama and Gilbert in 1979 (Agricultural Water Management, 2, 1979, p. 149-162).

5 parent solutions of different acrylamide and sodium acrylate copolymers are prepared in order to obtain concentrated solutions at 0.1 g/L (copolymers A to E in Table 1).

TABLE 1

List of polymers.

| | Form | Anionicity | Molecular weight |
| --- | --- | --- | --- |
| Polymer A | Concentrated liquid | 8% | 200,000 Da |
| Polymer B | Suspension | 30% | 12,000,000 Da |
| Polymer C | Reverse emulsion | 30% | 20,000,000 Da |
| Polymer D | Powder | 30% | 15,000,000 Da |
| Polymer E | Powder | 10% | 12,000,000 Da |

Remark: polymers A and B are those of example 1.

2 ml of each parent solution is doped in 5 different beakers at 500 ml of the synthetic irrigation water initially prepared. A 6$^{th}$ beaker containing only 500 ml of synthetic water is also prepared. The 6 beakers are plugged in order to be turned over simultaneously 20 times, then left to rest.

In less than 5 minutes, flocks form in the beakers containing polymers B, C and D. It is not possible to distinguish flocks in the beakers containing the irrigation water alone and the irrigation water doped with polymer A.

The content of each beaker is next poured through a sieve filter with a 130 μm mesh. This mesh size is commonly used to filter water intended for a drip irrigation system (Irrigazette, No. 146, 2015, p 10-15 "The origins of filter use in agriculture").

The retentate is next recovered by washing the filter with demineralized water, then placed in the dryer to quantify the dry matter retained by the filter.

TABLE 2

Dry matter of the retentate

| Trial | Retentate mass (mg) |
| --- | --- |
| Synthetic irrigation water | Not measurable |
| Synthetic irrigation water + 0.4 ppm of polymer A | Not measurable |
| Synthetic irrigation water + 0.4 ppm of polymer B | 33.5 |
| Synthetic irrigation water + 0.4 ppm of polymer C | 12.3 |
| Synthetic irrigation water + 0.4 ppm of polymer D | 20.0 |
| Synthetic irrigation water + 0.4 ppm of polymer E | 29.2 |

The matter in suspension contained within this synthetic irrigation water is therefore not retained through a filtration system commonly used for a localized irrigation system such as a drip irrigation system.

The addition of polymer A, which is representative of the polymer used in the method according to the invention, unlike the other polymers representative of the prior art, does not cause the formation of flocks with a size exceeding 130 μm, which could clog the emission orifices of a localized irrigation device such as a drip irrigation device.

Polymers B, C, D and E, representative of polymers used in the prior art, cause the clear formation of flocks with a size exceeding 130 μm, which could clog the emission orifices of a localized irrigation device such as a drip irrigation device.

Example 3

Horizontal Surface Diameter of the Moistening Bulb for a Surface Drip System 40 cm of soil is placed in 36 plastic cubic trays (depth: 90 cm, side: 60 cm). This soil is of the fibrous sandy type according to the Aisne texture triangle. The soil has previously been dried, then screened to remove the elements larger than 3 mm therefrom.

Each tray is pierced all the way through, at the height of the soil surface, to allow the passage of a drip irrigation pipe, from one to the next through the different trays, such that an emission orifice is positioned at the center of each of the trays. The device is repeated three times per lot of 12 trays.

The polyethylene drip pipe line is of the UNIRAM® type (provided by the Company NETAFIM). The drip pipes are self-regulating and have a flow rate of 0.7 dm$^3$/h (0.7 L/h).

Three irrigation solutions are prepared:
Solution 1: Water (water from the distribution grid).
Solution 2: Aqueous solution containing 12.5 ppm of copolymer A.
Solution 3: Aqueous solution containing 12.5 ppm of copolymer B.

Each aqueous solution is distributed through the pipe provided with drip pipes at a pressure of 0.15 MPa (1.5 bar), using a membrane pump, for 2 hours.

After two hours of irrigation, for each irrigation bulb, the surface diameter is measured longitudinally and orthogonally to the drip irrigation pipe. The calculated mean diameter of the surface irrigation bulbs is then the mean of these longitudinal and orthogonal diameters.

The mean diameter of the 12 surface irrigation bulbs for each of the three solutions is then calculated to lastly obtain a mean for the 12 irrigation bulbs.

The obtained results are then expressed in terms of an increase in the diameter of the irrigation bulb, using, as reference, the mean surface diameter for the irrigation bulbs obtained using the solution 1 (Table 3).

By squaring the comparison, the estimated gain is expressed in terms of an increase in the moistening surface.

TABLE 3

Obtained gains

| Type of Gain | Solution 2 (Polymer A) | Solution 3 (Polymer B) |
| --- | --- | --- |
| Increase in diameter | +18.1% | +24.4% |
| Increase in surface area | +39.4% | +54.7% |

Polymer A, representative of the polymer used in the inventive method, makes it possible to achieve the objective of increasing the horizontal diffusion of water from the irrigation bulb.

Solution 3 (Polymer B) required the intermediate preparation of a 1 g/L polymer solution to ensure the proper dilution of the latter. This intermediate solution was then added to the water from the tank intended for the irrigation. All of the steps for the preparation of solution 2 lasted 2 hours.

Solution 2 (Polymer A) was prepared in a single step by directly adding the polymer in concentrated solution to the water intended for the irrigation. The sole agitation generated by the tank return of the membrane pump allowed the preparation of solution 3 in 10 minutes.

The invention claimed is:

1. A method for the localized irrigation of crops or planted areas wherein an aqueous solution of at least one water-soluble polymer having a molecular weight between 10,000 and 500,000 Da and containing at least one acrylamide or methacrylamide monomer is injected into irrigation water, which irrigation water is delivered to crops or a planted area via a stationary localized irrigation technique.

2. The method according to claim 1, wherein the at least one water-soluble polymer has a molecular weight between 25,000 and 250,000 Da.

3. The method according to claim 1, wherein the at least one water-soluble polymer is added to the irrigation water under conditions such that the weight concentration of the at least one water-soluble polymer in the irrigation water is between 0.1 ppm and 500 ppm.

4. The method according to claim 1, wherein the at least one water-soluble polymer is injected into the irrigation water in the form of an aqueous solution, wherein the at least one water-soluble polymer is present in the aqueous solution at a concentration between 10 and 60% by weight.

5. The method according to claim 1, wherein the at least one water-soluble polymer contains at least 50 mol % of the acrylamide monomer or methacrylamide.

6. The method according to claim 5, wherein the at least one water-soluble polymer further contains from 1 to 50 mol % of at least one anionic monomer.

7. The method according to claim 6, wherein the at least one anionic monomer of the at least one water-soluble polymer comprises acrylic acid, methacrylic acid, itaconic acid, crotonic acid, maleic acid, fumaric acid, 2-acrylamido-2-methylpropane sulfonic acid, vinylsulfonic acid, vinylphosphonic acid, allylsulfonic acid, allylphosphonic acid, styrenesulfonic acid, or water-soluble alkaline metal, alkaline-earth metal, or ammonium salts thereof.

8. The method according to claim 1, wherein the at least one water-soluble polymer is non-ionic.

9. The method according to claim 1, wherein the at least one water-soluble polymer contains a cationic monomer of the acrylamide, acrylic, vinylic, allylic or maleic type having a quaternary amine or ammonium function.

10. The method according to claim 9, wherein the at least one water-soluble polymer comprises dialkylaminoethyl acrylate (ADAME), dialkylaminoethyl methacrylate (MADAME), quaternized or in salt form, diallyl dimethyl ammonium chloride (DADMAC), acrylamido-propyl trimethyl ammonium chloride (APTAC) and methacrylamido-propyl trimethyl ammonium chloride (MAPTAC).

11. The method according to claim 1, wherein the localized irrigation system is a drip system.

12. The method according to claim 1, wherein the water-soluble polymer is injected directly in line into an irrigation water pipe.

13. The method according to claim 4, wherein the at least one water-soluble polymer is added to the irrigation water under conditions such that the weight concentration of the at least one water-soluble polymer in the irrigation water is between 0.1 ppm and 500 ppm.

* * * * *